No. 769,093. PATENTED AUG. 30, 1904.
P. KREPP.
RETAPPING OR NUT SIZING MACHINE.
APPLICATION FILED OCT. 27, 1903.
NO MODEL. 2 SHEETS—SHEET 2.
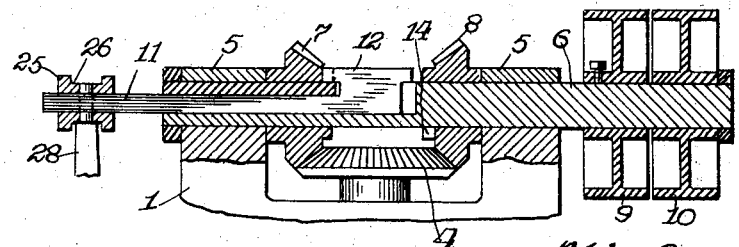
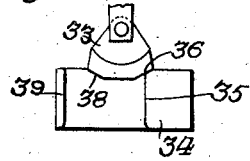
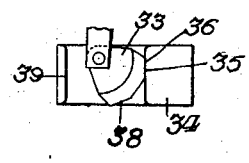
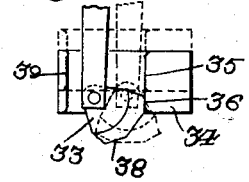
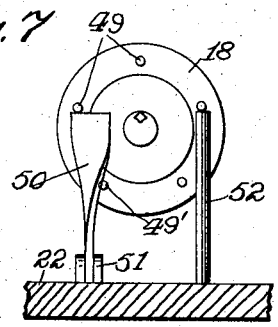
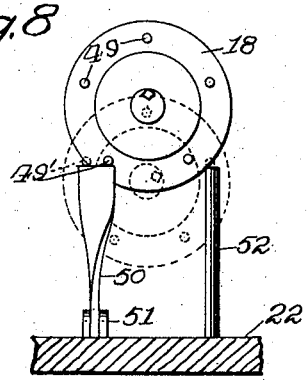
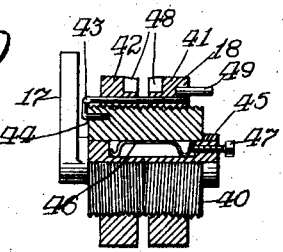
Witnesses:
Geo. B Rowley.
E. E. Potter.
Inventor
P. Krepp,
By his Attorneys.

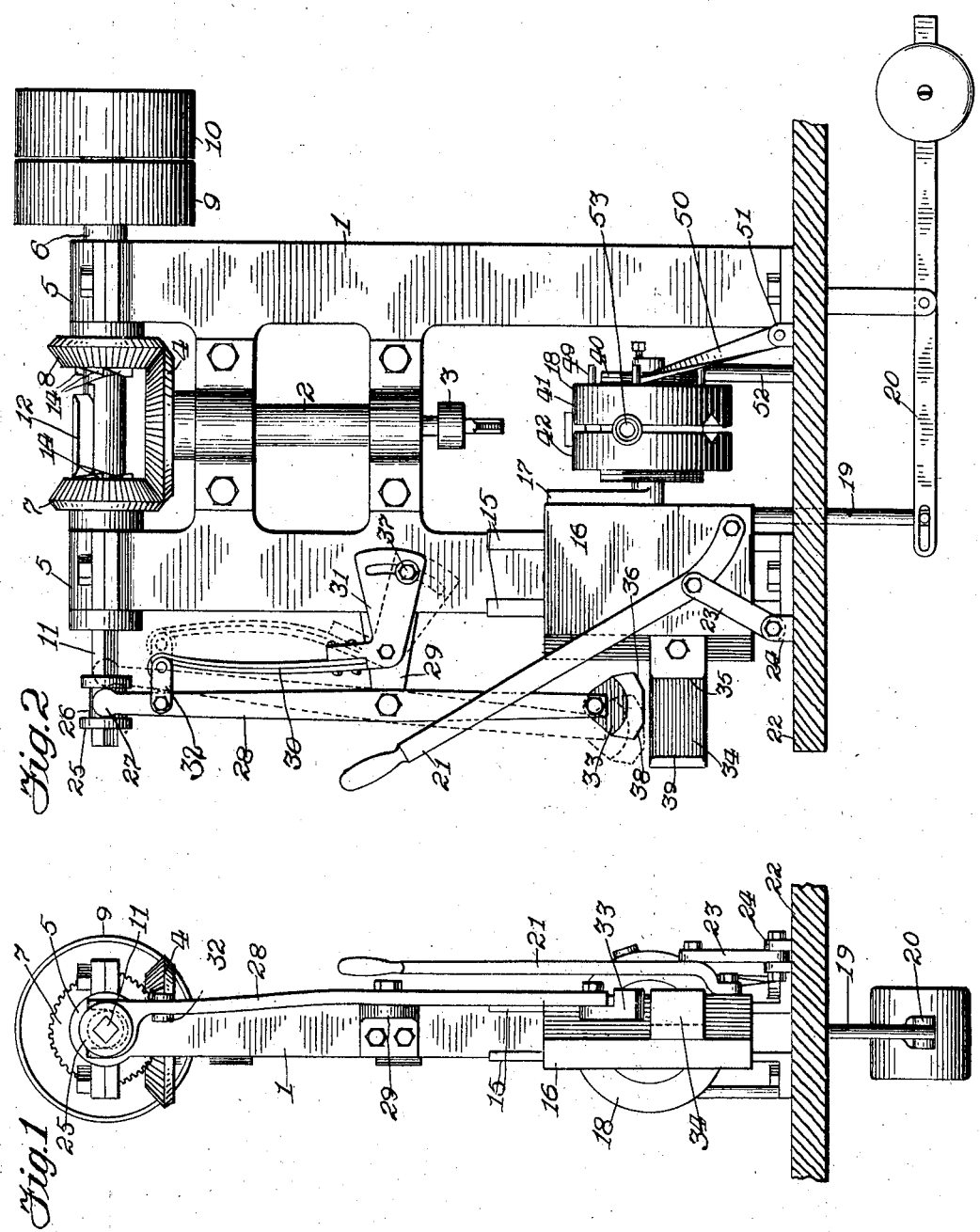

No. 769,093.

Patented August 30, 1904.

UNITED STATES PATENT OFFICE.

PETER KREPP, OF PITTSBURG, PENNSYLVANIA.

RETAPPING OR NUT-SIZING MACHINE.

SPECIFICATION forming part of Letters Patent No. 769,093, dated August 30, 1904.

Application filed October 27, 1903. Serial No. 178,736. (No model.)

*To all whom it may concern:*

Be it known that I, PETER KREPP, a citizen of the United States of America, residing at Pittsburg, in the county of Allegheny and State of Pennsylvania, have invented certain new and useful Improvements in Retapping or Nut-Sizing Machines, of which the following is a specification, reference being had therein to the accompanying drawings.

This invention relates to certain new and useful improvements in retapping or nut-sizing machines; and the object of the same is to provide a machine whereby the direction of rotation of the tap and the depth to which the same may enter the work may be adjusted, whereby the same will be automatically actuated.

A further object of this invention is to provide a machine which is especially adapted to clean out or "size" the tapped portion of the article which has been previously roughly tapped, and especially an article having a bottom, whereby should the tap be advanced too far into said article the tap would be broken by coming into engagement with the bottom.

As heretofore generally practiced the nut after it has been tapped or threaded in the rough is finished or retapped, or, as it is usually termed in the trade, "sized," by placing the nut in a holder, (as a vise or the like,) and a tap is then inserted therein by hand, which tap cleans out and finishes the thread cut when the nut was machine-tapped, so that the threads in all of the nuts of a certain size may be universal or uniform. This work of retapping or sizing of the nuts by hand is not only tedious, but it requires the exercise of considerable skill and care to accomplish the same without damaging the nut.

My invention involves means for accomplishing this work by machine in a rapid and effective manner, the nuts as they are received from the tapping-machine being placed into the retapping or sizing machine, the finishing or sizing tap being brought into operative engagement with the nut in positive and true position, whereby liability of injuring the thread is prevented and as the tap recedes and passes out of engagement with the nut the chuck which holds the nuts is automatically turned, thus permitting the nut that has been finished or sized to drop by gravity and bring another nut into position to be retapped or sized.

A practical embodiment of my invention is illustrated in the accompanying drawings, and in describing the invention in detail reference is had to the said drawings forming a part of this application and wherein like numerals of reference indicate like parts throughout the several views, in which—

Figure 1 is a side elevation of my improved device. Fig. 2 is a front elevation thereof. Fig. 3 is a central elevation of the drive-gear. Figs. 4, 5, and 6 are diagrammatical views showing the operation of the reversing-cam. Figs. 7 and 8 are elevations of the work-chuck, showing the operation of the same. Fig. 9 is a sectional elevation thereof.

Referring to the drawings, 1 indicates a suitable frame in which is rotatably mounted a spindle 2, to the lower end of which a chuck 3 is suitably secured and on the upper end of which a bevel-gear 4 is mounted. Suitably mounted in journals 5 6 is a drive-shaft 6, and on said shaft between said journal-boxes are loosely mounted the bevel-gears 7 8, both of which mesh with the gear 4 at all times. Mounted on the outer end of the shaft 6 is the usual drive-pulley 9 and idler-pulley 10, and the said shaft 4 at its opposite end is provided with a concentric opening in which the actuating-rod 11 is reciprocally mounted, and formed integral with said rod at its forward end is a locking projection 12, which is adapted to engage in suitable teeth 14 on one or the other of the gears 7 8, the teeth with which it engages depending upon its longitudinal position. Formed on a portion of the frame 1 are guides 15, over which is securely fitted a block 16, which is adapted to be elevated and lowered, and secured to this block 16 is a bracket 17, upon which the chuck 18 is rotatably secured. Connected to the lower end of the block 16 is an extending stem 19, to the lower end of which is connected a counterweighted lever 20, which is for the purpose of permitting the easy elevation of the block 16 and chuck connected therewith. The actuating-lever 21 has one end pivotally connected to the block 16 and is secured to the base or table 22 by a link 23, one end of which is secured in the bracket 24 and the other end of which is pivotally connected to the lever 21 adjacent to its lower end, whereby the depression of its upper end will raise the said block, as will be readily seen by reference to the drawings. Secured to the outer end of the actuating-rod 11 is a collar 25, in the annular groove 26 of which the bifurcated end 27 of the lever 28 is adapted to lie, this lever being pivoted intermediate its length to the bracket 29, secured to the frame 1 of the machine.

A leaf-spring 30, secured to the extension of the adjustable bracket 31, is connected to the lever 28 through the medium of the link 32, and, as shown in the drawings, the bracket 31 is so secured that the spring 30 forces the upper end of the lever 28 outwardly from the frame of the machine, whereby a portion of the rod 11 will engage the teeth 14 of the gear 7, and it will thus be seen that the rotation of the shaft 6 will positively rotate the gear 7 through this medium, thus driving the gear 4, mounted on the spindle 2, in a predetermined direction. When it is desired to reverse the direction of the gear 4, it becomes necessary to so actuate the lever 28 that the same will force the projection 12 of the rod 11 into engagement with the teeth 14 on the gear 8, whereby this gear may be the gear driving the gear 4, thus revolving the same in the opposite direction to that which has just been imparted to it by the gear 7. To automatically actuate the lever 28, as just described, a cam-block 33 is pivotally secured to the lower end thereof, and adjustably mounted upon block 16 is a slotted block 34, with which the cam-block 33 is adapted to coact when the said block 34 is elevated. The cam-block 33 depends from the lever 28 and is formed with two angular faces 36 and 38 on its bottom, the angular face 36 being adapted at one position of the lever 28 to be engaged by the face 35 of the block 34 and the other angular face 38 of the cam-block being adapted when the lever is adjusted to another position, as will be presently described, to be engaged by the face 39 of the block 34. The leaf-spring 30 forces the lever 28 to position, as shown in full lines, Fig. 2, which will so position the block 33 that the elevation of the block 16 will cause the face 35 of the block 34 to contact with the face portion 36 of the block 33, as clearly illustrated in Fig. 4, and upon further elevation of the block 34 the block 33 will be turned, as seen in Fig. 5, thereby forcing the lever 28 over to such position that the gear 8 will be operatively connected to the shaft 6, as before described. The said parts will remain in this position until such time as the block has been elevated to position shown in dotted lines in Fig. 6, when the spring 30 will force the lever back to the position shown in full lines in Fig. 2, and the gear 7 will then be in operative connection with shaft 6 and the gear 8 disconnected from operative relation therewith. Should it be desired to have the gear 7 in operative relation to the shaft 6 when the block 16 is being elevated, the nut 37, which secures the bracket 31 in position, is loosened and the said bracket moved to such position as that shown in dotted lines, when the tendency of the spring 30 will then be to draw the lever 28 toward it, and the face 38 of the block 33 will then contact with the face 39 of the block 34 during the elevation of the said block and force the lever 28 from position shown in dotted lines to that shown in full lines of Fig. 2 in the same manner as it was forced in the other direction. It will thus be seen that by adjusting the block 31 the tap, which is located in the chuck 3, may be revolved in either direction desired, the cam-block 33 serving to force the lower end of the lever 28 in one direction or the other, accordingly as the bottom of the cam-block contacts with the face 35 or the face 39 of the block 34, and consequently serving to maintain the gear 7 or the gear 8, as the case may be, in mesh with the gear 4 to turn the shaft 2 in one direction or the opposite direction as the block 16 ascends.

The construction and operation of the work-holding chuck is as follows: Rotatably mounted upon the bracket 17 is a circular member 40, the outer face of which is threaded right and left handed from the center thereof, and adapted to be screwed onto this circular member, at either end thereof, are the clamp members 41 42, the interior of one of which is provided with a right-hand thread, while the other has a left-hand thread, whereby to permit them to be threaded on the respective ends of the member 40. A locking-pin 43 is provided, whereby when said members 41 42 have been screwed onto the member 40 the desired distance the U-shaped end 44 of the said pin may be inserted in the aperture provided in the part 40, thereby preventing rotation of the said parts 41 42 on the said member 40. A collar 45 holds the part 40 on the extension of the bracket 17, and located in the slot formed in said extension is a U-shaped spring 46, against the outer end of which an adjusting-screw 47 bears, the position of the said screw determining the friction of the spring against the interior of the member 40, thereby providing means whereby undue rotation of the chuck will not take place when the same is being rotated. Cut-away portions 48, formed in the inner face of the parts 41 42, are provided, and the piece of work is adapted to lie therewithin, and a plurality of pins 49, corresponding in number with the number of cut-away portions 48, are provided on the exterior face of the part 41. An actuating member 56 is pivotally secured to a bracket 51 on the base 22 of the machine, and a vertical rod 52 is also secured on said base. The work which is to be tapped is placed in position, such as indicated at 53 in Fig. 2, and upon the elevation of the said chuck by the means described the tap will enter the work, which has been placed in the said chuck at the previous operation. Referring to Fig. 8, when the chuck has been elevated to its maximum position the lever 50 will engage pin 49', which was previously below its upper edge, and as the chuck is lowered, the said pin 49' being secured against being lowered by the lever 50, the entire chuck will be rotated around its bearing and will descend until such time as one of the pins rests upon the upper end of rod 52, whereby further descent of the chuck is prevented.

Although the device shown and described was designed and has been generally used by me for the retapping or sizing of the nuts, yet it will be evident that the same may be employed as a tapping-machine for tapping or cutting the original thread in the nut, or a die may be used instead of a tap, the operating of the device when so used being the same as described herein for operation in the retapping or sizing of the nuts. As the work-holding chuck is revolved after the nut has been retapped or sized the finished nut drops out of the chuck and another nut that has been placed therein by the operator is brought into position to be retapped or sized.

While I have herein shown and described in detail a practical embodiment of my invention as it is practiced by me, yet it will be observed that various changes may be made in the details of construction without departing from the general spirit of my invention.

The operation of the type of machine herein disclosed may be set forth as follows: The blanks having been placed within the chuck, as illustrated in Fig. 2 of the drawings, lever 21 is operated downwardly in order to create an upward movement of the block 16 and bring the blank of the chuck directly beneath the tap into engagement with the latter. The block 34 being movable with the block 16 will engage the cam-block 33 by engagement therewith of the face 35 of block 34 with the face 36 of the cam-block, tilting the cam-block and by virtue of the pivotal connection of the latter with the lever 28 creating an outward movement of the lower end of the lever and reverse movement of the upper end thereof, imparting an inward thrust to the locking projection 12, thereby permitting bevel-gear 7 to loosely revolve on the shaft 6 and locking bevel-gear 8 thereto, thus reversing the direction of rotation of the tap, it being understood that the inward thrust is only imparted to the locking projection 12 during the upward movement of the block 34 of block 16. Upon lowering of the block the cam-block 33 being released from the confines of the face 35 of block 34 when the block 34 reaches the limit of its upward movement the lever 28 will be again permitted to assume its normal inward position by virtue of the pressure exerted on the upper end thereof through the medium of the spring 30. During the upward movement of the chuck the pin 49, in engagement with the upper end of the pivoted lever 50, will move away therefrom, and the succeeding pin, (designated for the purpose of illustration as pin 49',) however, being identical with pins 49, will automatically cause an outward movement of the upper free end of the lever 50, as will be very clearly seen in Fig. 2 of the drawings, the upward movement of the chuck being continued until the said pin 49' has passed the free upper end of the lever, at which time the pin diametrically opposite the said pin will be in engagement with the rod 52. The upper end of the lever, however, being free of the pin 49' will again by gravity move inwardly to bear against the face of the chuck, assuming the position shown in Fig. 2. It will be understood that the nuts are set loosely in the sockets provided in the work-holding chuck, and owing to the revolution of the chuck at the completion of each cutting operation the nuts will when the same pass the center of gravity fall from the sockets.

Having fully described my invention, what I claim as new, and desire to secure by Letters Patent, is—

1. In a machine of the type described, the combination of a tool-holding spindle, a shaft, intermeshing gears mounted on said shaft and spindle, a reciprocating block, a work-holding chuck carried by said block, a cam-actuating block carried by said first-named block, clutch mechanism adapted to alternately engage the gears on the shaft, and thereby cause the gear on the spindle to be alternately revolved in opposite directions, a pivoted lever connected to said clutch mechanism, a pivoted cam carried by said lever and having an angular face, said angular face being engaged by the cam-actuating block on the upward movement of the same so as to cause the said pivoted lever to be moved by the upward movement of the cam-actuating block, and thereby reverse the movement of the said spindle.

2. In a machine of the type described, the combination of a shaft, a reversing mechanism carried thereby, a tool-holding spindle actuated by said shaft, a reciprocating block, a chuck carried by said block, a pivoted lever connected to said reversing mechanism and adapted to be oscillated by said block, an adjustable bracket, a spring carried by the bracket and connected to the lever, means for locking the bracket in its adjusted position whereby the said spring can be arranged to move the lever in either direction according as the bracket is fixed in one or the other of its adjusted positions, and means on the block for positively moving the lever in a direction opposite to either of the directions in which it is moved by said spring.

3. In a machine of the type set forth, the combination with a rotary shaft, a rotary spindle receiving motion from said shaft, a reciprocating block, a work-holder carried by said block, means for reciprocating the said block and means operated by said block for positively maintaining the shaft and spindle in operative connection during the entire movement of the block in one direction, and for producing a reversal of the movement of the spindle coincident with the cessation of movement of the block at the termination of its stroke.

4. In a machine of the type set forth, the combination of a rotary spindle, means for rotating said spindle, a reciprocating block, a work-holder carried by said block, means for reciprocating the block and means operated by the block for maintaining the spindle in motion in one direction during the entire movement in one direction of the block and also operated by the block for reversing the direction of motion of the spindle coincident with the beginning and termination of movement of the block in an upward direction.

5. In a machine of the type set forth, the combination of a rotary shaft, a spindle receiving motion therefrom, a reciprocating block, a work-holder carried by said block, and means operated by the block for reversing the movement of the spindle by the first portion of the movement of the block toward the spindle and again coincident with the cessation of movement of the block toward the spindle.

6. In a machine of the type set forth, the combination of a rotary spindle, a shaft operatively connected to the spindle, a reciprocatory block, a work-holding chuck carried by said block, means for manually reciprocating the block, and means actuated by said block for automatically reversing the movement of the spindle during the movement of the block and again automatically reversing the movement of the spindle coincident with the termination of the movement of the block.

7. In a machine of the type set forth, a reversible tool-holding spindle, operated from a driven shaft, a work-holding chuck movable toward and away from the tool-holding spindle and revoluble intermittently on its spindle, a reciprocatory block from which said work-holding chuck is supported, a pivoted reversing-lever having its one end engaged with mechanism to reverse the direction of rotation of the spindle, a cam-block pivoted in the opposite end of the reversing-lever, and adapted when turned on its pivotal point to form a lateral extension of the lever, during the upward movement of the block and depend in inoperative position during the downward movement of the block, means carried by the reciprocatory block for engagement with the cam-block to actuate the reversing-lever, means for operating the reciprocatory block, and means for imparting a partial rotation to the work-holding chuck as it moves away from the tool-holding spindle.

8. In a machine of the type set forth, a reversible tool-holding spindle operated from a driven shaft, a work-holding chuck movable toward and away from the tool-holding spindle, a reciprocatory block from which the work-holding chuck is supported, a pivoted reversing-lever having its one end engaged with mechanism to reverse the direction of rotation of the spindle, a cam-block pivoted in the opposite end of the reversing-lever and adapted to be engaged by the reciprocatory block so as to move the lever during the upward movement of the block and adapted to be disengaged from the block during the downward movement of the latter, and means carried by the reciprocatory block for engagement with the cam-block, to actuate the reversing-lever.

9. In a machine of the type described, the combination of a rotatable shaft, a rotatable tool-carrying spindle, means connecting the spindle to the shaft and operable to reverse the direction of rotary movement of the spindle, a reciprocatory work-holding chuck, a pivoted spring-pressed lever connected to and adapted to effect the actuation of the means for reversing the direction of movement of the spindle, a cam-block pivotally carried on said lever and adapted to be turned on its pivot by the block during the upward movement of the same to move the lever in opposite direction to the movement imparted to it by the spring and means actuated by the movement of the work-holding chuck for turning the cam on its pivot to move the lever during the upward movement of the block for rendering the cam inoperative to move the lever during the downward movement of the block.

In testimony whereof I affix my signature in the presence of two witnesses.

PETER KREPP.

Witnesses:
A. M. WILSON,
E. E. POTTER.